United States Patent
Pounds et al.

(10) Patent No.: US 10,747,783 B2
(45) Date of Patent: Aug. 18, 2020

(54) DATABASE ACCESS USING A Z-CURVE

(71) Applicant: eBay Inc., San Jose, CA (US)

(72) Inventors: Jennica Jane Pounds, Bellevue, WA (US); Aidan Rogers, Shoreline, WA (US); Stanislav Pugach, Fall City, VA (US)

(73) Assignee: eBay Inc., San Jose, CA (US)

(*) Notice: Subject to any disclaimer, the term of this patent is extended or adjusted under 35 U.S.C. 154(b) by 306 days.

(21) Appl. No.: 15/841,925

(22) Filed: Dec. 14, 2017

(65) Prior Publication Data

US 2019/0188311 A1 Jun. 20, 2019

(51) Int. Cl.
G06F 16/28 (2019.01)
G06F 16/22 (2019.01)
G06F 16/2458 (2019.01)
G06F 3/06 (2006.01)

(52) U.S. Cl.
CPC .......... G06F 16/283 (2019.01); G06F 3/0611 (2013.01); G06F 16/2246 (2019.01); G06F 16/2264 (2019.01); G06F 16/2465 (2019.01)

(58) Field of Classification Search
CPC .................. G06F 16/2246; G06F 16/2264
See application file for complete search history.

(56) References Cited

U.S. PATENT DOCUMENTS

| 5,963,956 | A | * | 10/1999 | Smartt ................ G06F 16/2264 |
| 6,625,611 | B1 | | 9/2003 | Teig et al. |
| 6,662,184 | B1 | | 12/2003 | Friedberg |
| 6,859,455 | B1 | | 2/2005 | Yazdani et al. |
| 7,054,315 | B2 | | 5/2006 | Liao |
| 7,167,856 | B2 | * | 1/2007 | Lawder ............... G06F 16/2264 |
| 8,217,952 | B2 | | 7/2012 | Chandrasekaran |
| 2010/0082654 | A1 | | 4/2010 | Zhang et al. |
| 2010/0185692 | A1 | * | 7/2010 | Zhang ................. G06F 16/2264 707/803 |
| 2012/0166446 | A1 | * | 6/2012 | Bowman ............. G06F 16/2246 707/743 |
| 2013/0006653 | A1 | | 1/2013 | Mills |
| 2013/0046793 | A1 | | 2/2013 | Reznik et al. |
| 2013/0271465 | A1 | * | 10/2013 | Clarberg ................ G06T 15/80 345/426 |
| 2014/0236960 | A1 | * | 8/2014 | Russakovsky .... G06F 16/24557 707/741 |

(Continued)

FOREIGN PATENT DOCUMENTS

WO 2013/119173 A2 8/2013

OTHER PUBLICATIONS

Tropf, Herbert, and Helmut Herzog. "Multidimensional Range Search in Dynamically Balanced Trees." Angewandte Info. 2 (1981): 71-77. (Year: 1981).*

(Continued)

Primary Examiner — William Spieler
(74) Attorney, Agent, or Firm — Newport IP, LLC

(57) ABSTRACT

Improved access of a multidimensional database can be implemented using a space-filling curve, such as a z-order curve, and a tree structure. A state engine is configured to track the state of the dimensions of the database as the tree structure is traversed. Different states allow optimizations such as avoidance of analyzing a dimension for further nodes of the tree and removal of multiple nodes in a sub-tree.

20 Claims, 10 Drawing Sheets

(56) References Cited

U.S. PATENT DOCUMENTS

2015/0310047 A1    10/2015  Zhou
2015/0324399 A1*   11/2015  Tyercha .............. G06F 16/221
                                                      707/792
2017/0255682 A1    9/2017   Pounds et al.

OTHER PUBLICATIONS

Ramsak, Frank, et al. "Integrating the UB-tree into a database system kernel." VLDB. vol. 2000. 2000. (Year: 2000).*
International Search Report for PCT Application No. PCT/US2018/065335, dated Feb. 22, 2019, 5 pages.
International Written Opinion for PCT Application No. PCT/US2018/065335, dated Feb. 22, 2019, 5 pages.

* cited by examiner

QUERY = 43

DISTANCE = $0^2$

DISTANCE = $21^2$

DATABASE ACCESS USING A Z-CURVE

TECHNICAL FIELD

The present application relates generally to the technical field of database management, and, in various embodiments, to systems and methods for efficiently accessing a database using a z-curve.

BACKGROUND

With the explosive growth of network technologies, including the Internet and mobile devices, the amount of data to be saved, indexed, and retrieved has drastically increased. To store data for easy retrieval, databases have increased in size and complexity. However, the rate at which data is generated has created issues for storage-related technologies. One approach for storing data involves large "Big Data" systems, some of which may be managed in a NoSQL scheme, in which data is distributed across nodes and queries are generated, translated, and delegated to a number of nodes for local processing of data (e.g., as in Hadoop, HFDS, or HBase file system(s)). Other approaches, such as those of conventional relational database techniques, tend to handle the increase of data to be stored with sheer computational power. Yet both approaches commonly rely on multiple computer systems working in concert to perform tasks.

Scaling across multiple computer systems necessitates global indexing of files across the system so that each of the computers in the system knows where each file resides. Global indexing creates a bottleneck that is not easily fixed. As more files are added and indexed, the entire system must be synced, which takes time and slows the system down. One approach to the scaling and indexing issue is to store files in sorted order when received, the rationale being that if the files are always sorted, then syncing is not necessary as each computer or computational node knows how to traverse the sorted index to locate a given file.

However, the sorted approach creates new issues as to data records with many columns and queries that specify those columns. For example, if a record has many columns and a query specifies several of the columns, the system may be able to sort only one column at a time. Thus, a first column is sorted, then a second column, et cetera, until target query data is parsed and ready to provide to a user or program as query results. However, this approach becomes slow and unmaintainable for large data stores having many columns and multitudes of rows, for example, such as those that regularly occur in large enterprise networks or modern Internet environments.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

As mentioned, management of data across large distributed data stores, e.g., Hadoop, HFDS, or HBase file system(s)), can become slow and inefficient as the amount of data to be stored, indexed, and retrieved increases. To this end, a multidimensional data structure can use a z-curve and a z-tree to efficiently manage large amounts of data. In some example embodiments, for a given query, a query box is created that specifies ranges for which data is to be returned from the multidimensional data structure. The addresses of entries (e.g., rows) of the data structure can be created from the addresses of the dimensions of the data structure. A state engine can traverse the z-tree using de-interleaved addresses and track a plurality of states. The states can efficiently track whether the state engine is inside or outside the query box. In at least one embodiment, the state engine may eliminate one or more nodes from a given search based upon a parent node reaching an outside state. In this way, the state engine can more efficiently perform queries on large multidimensional databases.

In some embodiments, a distance engine can be configured to use the z-curve and the z-tree to more efficiently perform nearest neighbor analysis of data items stored in the multidimensional data structure. In at least one embodiment, for a given query item, the distance engine uses a heap-based approach to determine the nearest set of data points to a given queried point. The distance engine can further be configured to eliminate one or more nodes in the z-tree from the nearest neighbors search by minimizing the distance of uncalculated nodes.

Figure 1:
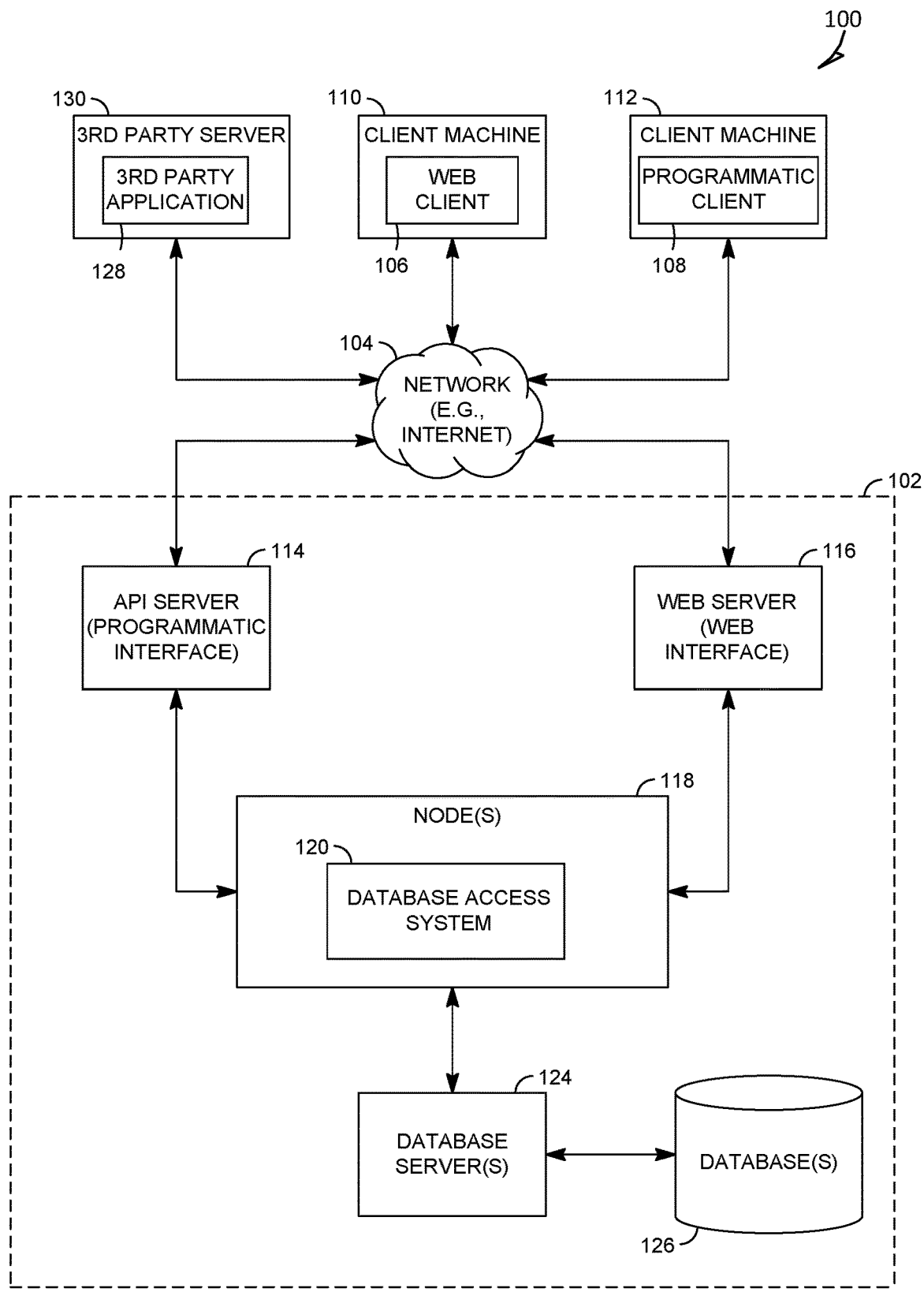
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based publication system, provides server-side functionality, via a network 104 (e.g., the Internet or a Wide Area Network (WAN)), to one or more clients. FIG. 1 illustrates, for example, a web client 106 (e.g., a browser) and a programmatic client 108 executing on respective client machines 110 and 112.

An API server 114 and a web server 116 are coupled to, and provide programmatic and web interfaces respectively to, one or more nodes 118, which may be implemented as physical host servers, virtual machines, or containerized computing entities (e.g., Linux containers, operating-system level virtualizations). The one or more nodes 118 may host a database access system 120, which may be used to access a curve data structure and a tree data structure as disclosed in further detail below. In some embodiments, the database access system 120 may be implemented as software application(s) or hardware.

The one or more nodes 118 are, in turn, shown to be coupled to one or more database servers 124 that facilitate access to one or more databases 126. In some embodiments, the one or more database access system 120 are integrated into the database servers 124, while in some embodiments, the one or more database access system 120 are built as separate components (e.g., nodes 118) that interface with the one or more database servers 124.

The one or more database access system 120 provide a number of database or publication system functions and services to users who access the networked system 102. While the one or more database access system 120 are shown in FIG. 1 to form part of the networked system 102, it will be appreciated that, in alternative embodiments, the one or more database access system 120 may form part of a database system that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various one or more database access system 120 could also be implemented as standalone software programs, which do not necessarily have networking capabilities.

The web client 106 accesses the one or more database access system 120 via the web interface supported by the web server 116. Similarly, the programmatic client 108 accesses the various services and functions provided by the one or more database access system 120 via the programmatic interface provided by the API server 114. The programmatic client 108 may, for example, have executable code to configure curve data, configure tree data, or perform database actions (e.g., CRUD: create, read, update, delete) on data in the database 126 using the one or more database access system 120.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102 and may use the one or more database access system 120 to more efficiently access data in the database 126 as it becomes required to carry out tasks for the marketplace.

Figure 2:
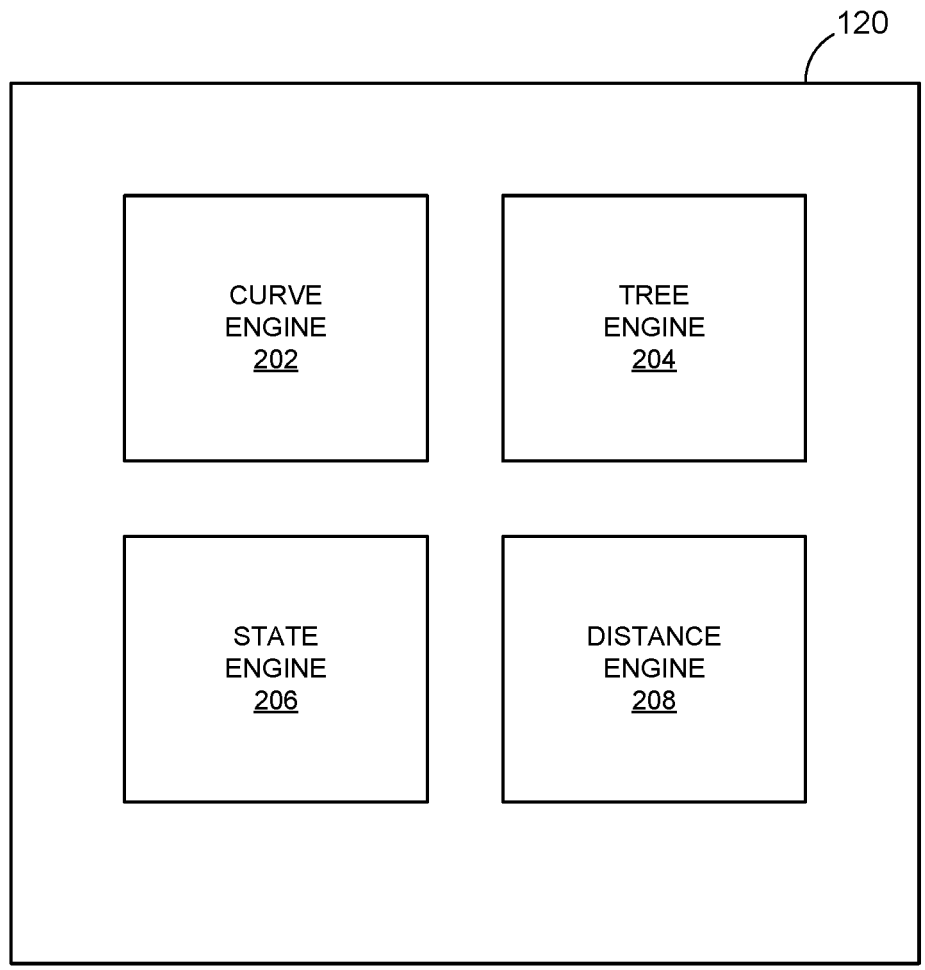
FIG. 2 illustrates a block diagram showing internal functional components of a database access system integrated into a networked system, according to some embodiments.

FIG. 2 illustrates a block diagram showing components provided within the database access system 120, according to some embodiments. The database access system 120 is hosted on dedicated or shared server machines that are communicatively coupled to enable communications between the server machines. The components themselves are communicatively coupled (e.g., via appropriate interfaces) to each other and to various data sources, so as to allow information to be passed between the applications or so as to allow the applications to share and access common data. Furthermore, the components access the one or more databases 126 via the database servers 124 and the database access system 120.

The database access system 120 provide a number of curve, tree, and database access mechanisms that allow the system 100 to more efficiently access data in the database 126. As illustrated, the database access system 120 comprises a curve engine 202, a tree engine 204, a state engine 206, and a distance engine 208. The curve engine 202 manages generating and maintaining a multidimensional database that maps to a z-curve. The curve engine 202 can further be configured to interpret a query from another language (e.g., structure query language) to range limits on columns or dimensions of the multidimensional database. The tree engine 204 manages a tree structure (e.g., a radix tree, a "trie") that stores addresses of entries of the multidimensional database that have stored data. The state engine 206 manages tracking states of dimensions of the multidimensional database to speed up queries against the multidimensional database. The distance engine 208 is configured to use the multidimensional database and the tree structure to efficiently calculate potential distances between data items where the full address of the data items may be unknown.

Generally, a space-filling curve is a line-based data construct that can "fill" or traverse all points in an n-dimensional space. For example, in two dimensions (2D), a Hilbert curve is a one-dimensional curve that can span every point in the 2D space over many iterations. Space-filling curves can also fill higher-dimensional space, such as 3D, 4D, . . . , n-D space in the same way: spanning all points in the space over many iterations.

Some space-filling curves, such as a z-order curve, can be used to encode data in a database. A z-order curve encodes data from multiple dimensions to one dimension (that of the curve) by interleaving binary coordinates of each dimension for each point along the curve. Each point along the curve can be specified by referring to the interleaved coordinates of the dimensions (e.g., columns of a relational database). The interleaved coordinates may correspond to keys of a sorted-key database, such as HBase. Entries in a multiple dimensional database using interleaved coordinates may include Booleans, short ASCII strings, floating point values, timestamps, and integers.

Figure 3:
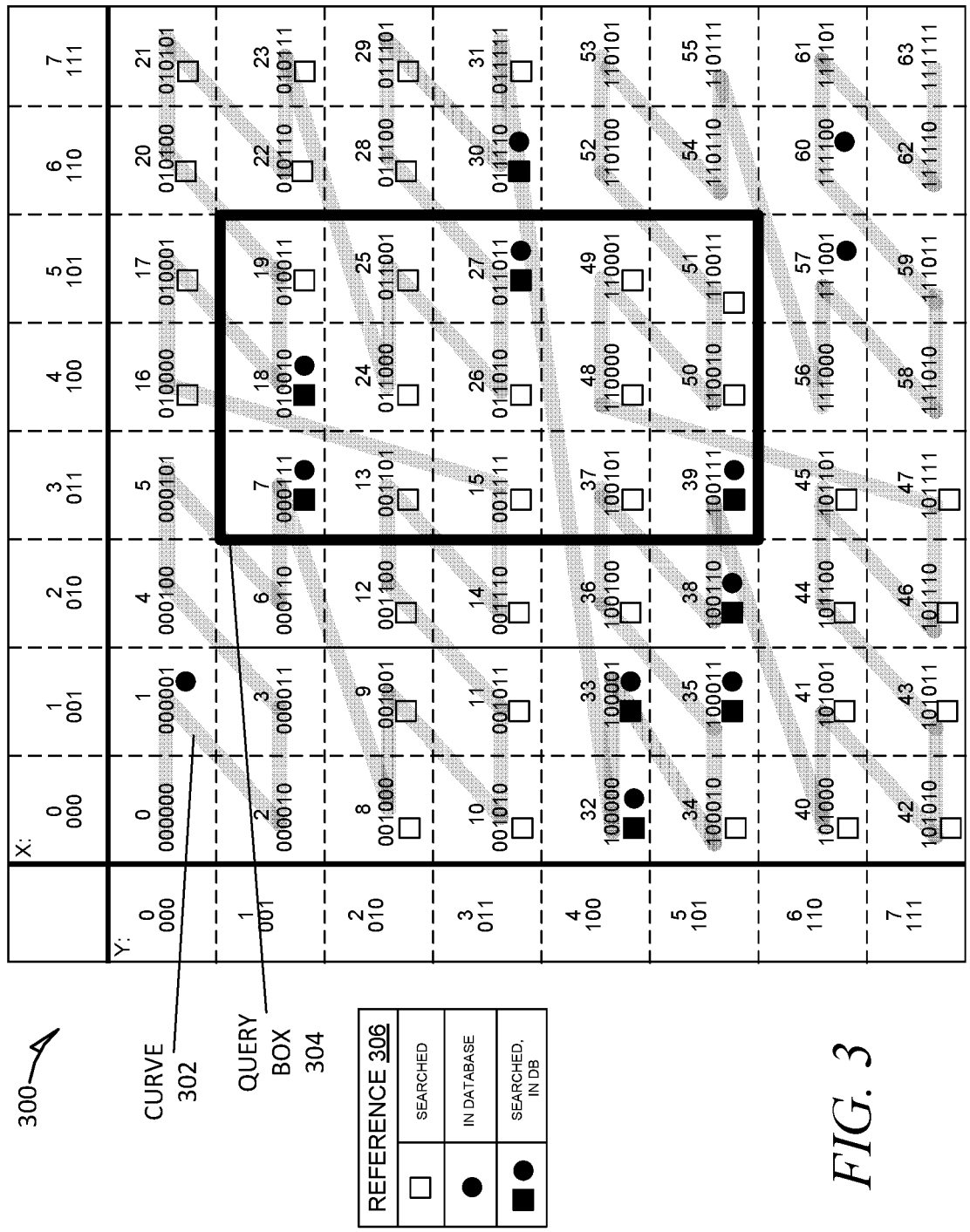
FIG. 3 illustrates a query against a multidimensional data data structure mapped by a space-filling curve, according to some embodiments.

FIG. 3 shows an example data structure 300 having two dimensions, X and Y, each of which span from 0 to 7, and each of which is referred to by a prefix or sequence of three bits. For example, referring to the X dimension, 0 is to 000, 1 is to 001, 2 is to 010, etc.; the Y dimension is similarly arranged. The Y and X dimensions correspond to columns of a relational database. The intersection of two columns from the Y and X dimensions is a square that corresponds to a row of the relational database. For example, the square labeled "46" is a database row having intersecting values referenced by its Y and X coordinates, 2 (binary 010) and 7 (binary 111), respectively.

As mentioned, each row may be encoded as an interleaved or alternating sequence from each Y and X coordinate (or any number of coordinates, alternating through each dimension the same way). For example, row 46, which is referenced by 2 (binary 010) and 7 (binary 111), may be interleaved as follows: 101110, where the first digit is the first digit of binary 111, the second digit is the first digit of binary 010, the third digit is the second digit of binary 111, the fourth digit is the second digit of binary 010, the fifth digit is the third digit of binary 111, and the sixth digit is the third digit of binary 010. Interleaving Y followed by X (instead of X then Y) results in addresses that exhibit a z-structure, as shown by curve 302. It is appreciated that although FIG. 3 shows two dimensions, that of Y and X, data structure 300 may comprise a high order of dimensions that may be reduced down to a single dimension of the curve 302 in the same way: interleaving coordinate values of each dimension, Y followed by X.

The curve 302 is also illustrated in FIG. 3 as spanning the data structure 300. The curve 302 is a z-order space-filling curve that passes through every row in the data structure 300. In the example curve illustrated in FIG. 3, the curve 302 follows each entry's address in an increasing order, e.g., from 000000 to 000001 to 00001 to 000011, etc. In a similar manner, other space-filling curves, such as a Hilbert curve, is implemented as curve 302 to extend to n dimensions such that it passes through every point in space, where each point in space is a possible entry in a multiple dimension database. As such, the data structure 300 may map data in a high order of dimensions and corresponding columns. In this way, the curve 302 is a one-dimensional structure that can span any n-dimensional space as a one-dimensional structure of addresses concatenated one after another (e.g., the first 12 bits of curve 302 are 000000000001, which is six zeroes from row 1, five zeroes from row 2, and ending with the 1 from row 2).

Queries for data in a plurality of rows of the data structure 300 may be between a specified plurality of ranges of any number of dimensions in the data structure 300. As one example, a query for data between two ranges is illustrated as a query box, such as a query box 304. For ease of reference, though the term "box" is used here to refer to two ranges in two dimensions, the term "box" may also be used to refer to a query for data in any number of dimensions (e.g., in four dimensions, the box would be a hyper-cube query "box"). Further, the term "box" does not limit the proportion of ranges with respect to one another; that is, a "box" may be a square, rectangle, or other shapes having boundaries that correspond to limits specified in a query.

Though the data structure 300 comprises a number of rows from 0 to 63, not every row may contain data that is in a database being queried. A reference 306 is illustrated to elucidate what data may be managed or referenceable by data structure 300.

In the example illustrated, the lowest value of the query box 304 is 7 and the highest value is 51. In some example embodiments, the curve 302 is followed from row 7 to row 51 to search for query results. As illustrated, though the query is for entries falling within a specified query box 304, the curve 302 spans many rows that fall outside the query box 304. Each row that is searched along the curve 302 is labeled with an empty box, as shown in reference 306.

The points that are searched (e.g., rows labeled with empty boxes) may be identified as follows: first, identify the lower bounds (row 7) and upper bounds (row 51); second, all rows along the curve 302 between the lower bounds and upper bounds are searched by traversing the curve 302. For example, as illustrated, following the curve 302, each row from row 7 to row 51 is searchable and thus labeled with an empty box, for reference. As mentioned, the number of rows searched along the curve 302 can far exceed the actual number of relevant rows inside the query box 304; there are 15 rows in the query box 304, yet 45 rows searched along the curve 302. Conventionally, this may present problems in using space-filling curves for database access because the lower and upper bounds for many queries create a curve 302 that covers vast numbers of the rows in the database, while only a small number of those rows are relevant to a given query.

Continuing, as illustrated in the reference 306, if the row under consideration in the database contains actual data, then the row is labeled with a black filled-in circle to indicate that data exists in the database. Further, a row that is both searched (as it is along the search path of the curve 302) and also contains data in the database is labeled with a black filled-in box next to the black filled-in circle, side-by-side, as illustrated in the reference 306. However, even if the data exists and even if the row is searched, the data may still not be what is being requested in the query. For example, row 30 is searched along the curve 302 and contains data, but it is still not within the query box 304, so it is not relevant to data being requested. In contrast, for example, row 39 is searched, has data, and is within the query box 304, and thus is relevant to the data being requested; that is, row 39 is a hit. Further details regarding the multidimensional data structure mapped to a curve are found in application Ser. No. 15/063,338, titled "Improved Database Access Using A Space-Filling Curve", filed on Mar. 7, 2016, which is incorporated by reference in its entirety.

Figure 4:
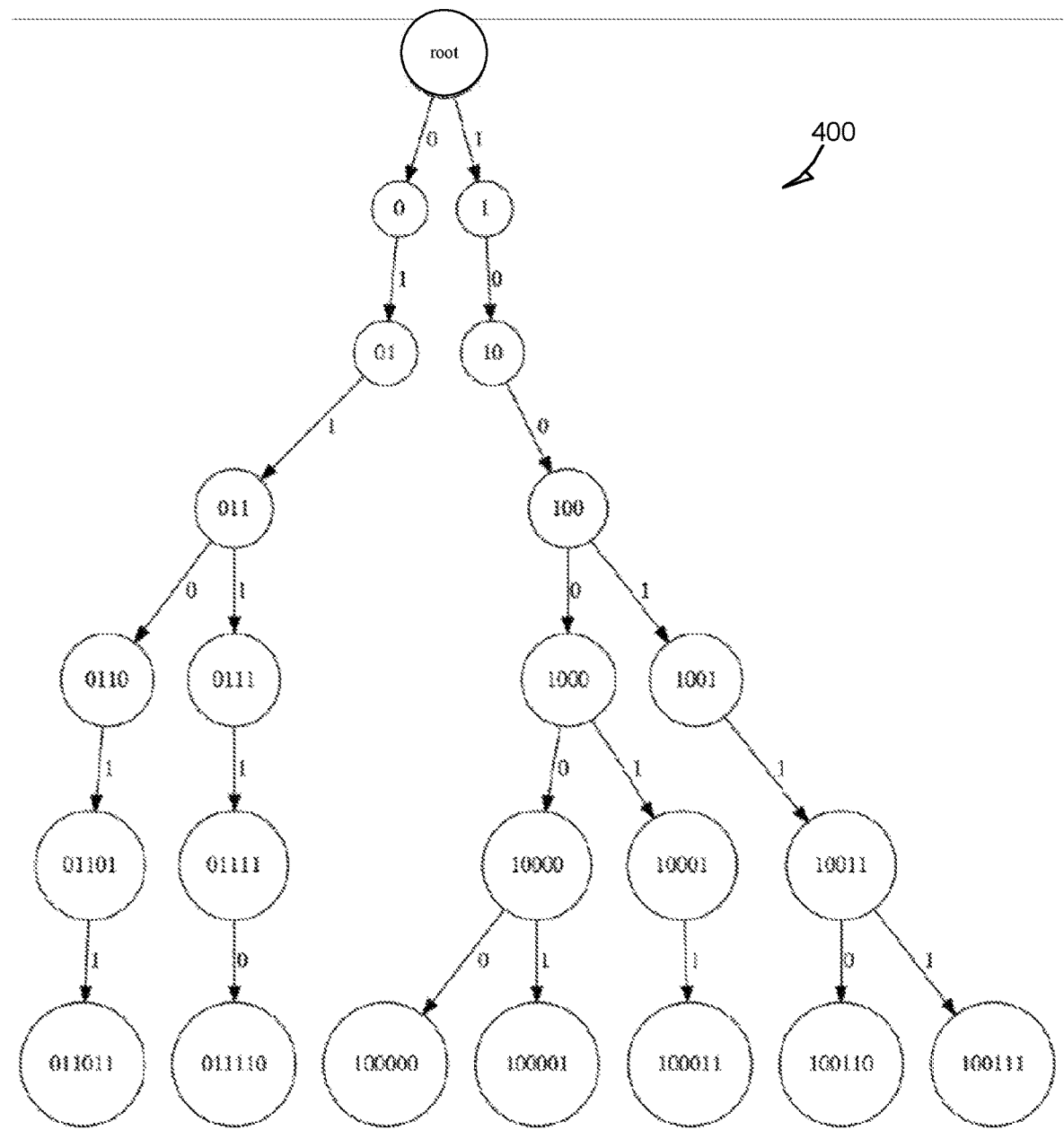
FIG. 4 illustrates a tree structure that stores addresses of rows in a data structure that contain data, as according to some embodiments.

In some example embodiments, to quickly reference rows that have data in the data structure 300, the addresses of rows storing data are tracked using a tree data structure, such as z-tree 400 illustrated in FIG. 4. The z-tree 400 comprises a plurality of nodes illustrated as circles. Inside each circle is a number modified (e.g., by adding/appending digits) in order to arrive at that node. The arrows from node to node correspond to one or more digits to be appended to arrive at the node immediately below. At the bottom of the z-tree 400 are leaf nodes, each of which corresponds to a row that contains actual data in data structure 300.

As the z-tree 400 comprises the rows located in the database, the z-tree 400 can be implemented as a lookup, and can be traversed to determine whether a given row contains actual data. For example, to determine whether row 32, which has an interleaved address of "100000", is in the database, the z-tree 400 is checked: first, at the root level follow the path down to the "1" node (because "100000" starts with "1"), then follow the path down for each "0" to determine that, in fact, "100000" is in the z-tree 400 and hence has a data entry in the database.

Figure 5:
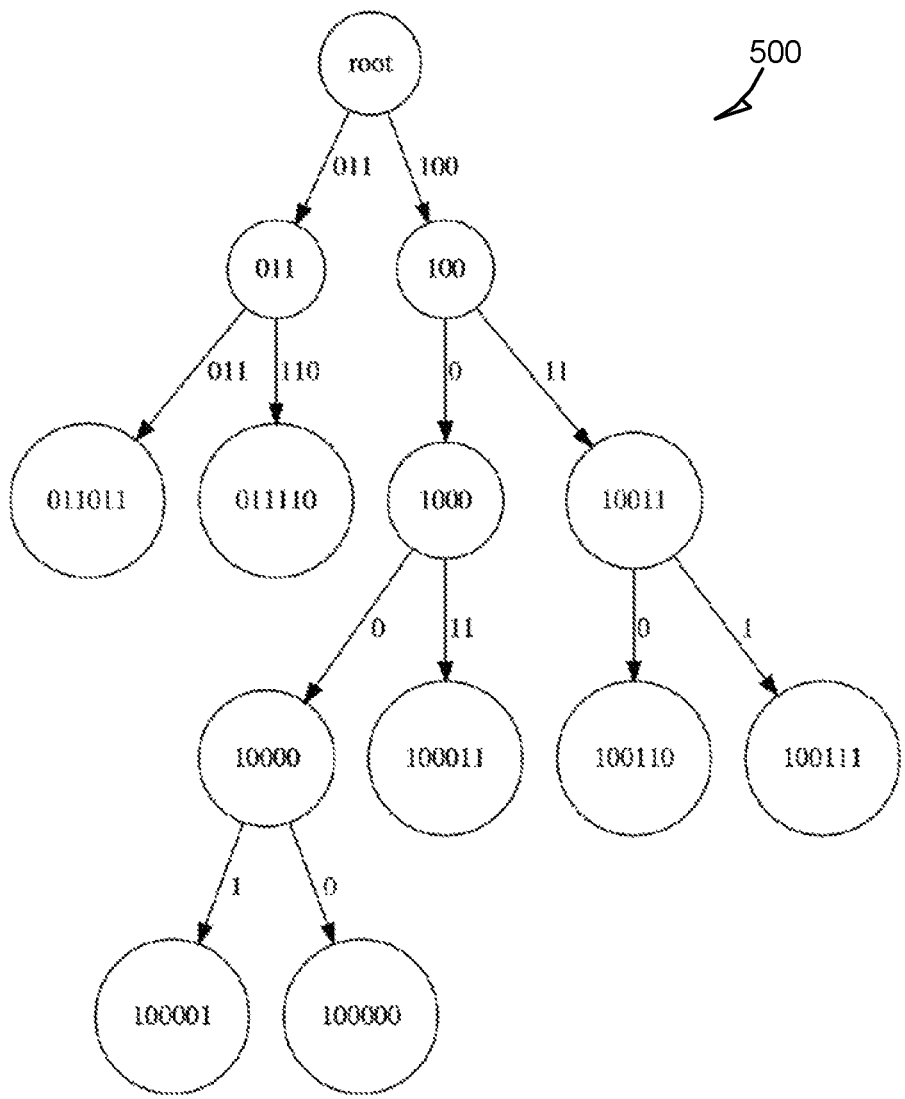
FIG. 5 illustrates a merged tree structure that stores addresses of rows in a data structure that contain data, according to some embodiments.

FIG. 5 shows a z-tree 500 which may be used to store addresses of rows that have data in data structure 300, according to some example embodiments. In contrast with the z-tree 400, the compressed z-tree 500 merges similar nodes (e.g., nodes having common prefixes) into a single merged node. This saves memory as the tree 500 is smaller in size, and increases lookup or tree traversal speed as there are fewer nodes to analyze. For example, a system searching for "100000" can go from the root node to node "100", thus skipping two nodes. At node "100", a 0 is appended to arrive at node "1000", another 0 is appended to arrive at node "10000", and another 0 is appended to arrive at node "100000", which is the last node, which indicates that indeed "100000" does in fact correspond to a row in the database that contains actual data. In this way, unnecessary nodes are merged out or skipped.

Further, each transition amount (e.g., digits along the arrows) can differ from nodes in different levels. For example, if searching for "100111", starting at node "100", the two-digit "11" can be added to jump down to node "10011", thereby merging over or skipping a node (e.g., appending "1" twice). Further, differing transition amounts can further compress the amount of data stored per path. As illustrated in FIG. 5, there are more nodes (and more data to be processed) on the path from root to 100000 than on the path from root to 011011, the latter only having two transitions from root (e.g., 011 appended two times).

In some example embodiments, dimensions can be tracked via a small set of states to reduce or eliminate the potential false hits caused by following the curve 302 into the query box 304 and landing on a row that does store queried data.

At a high level, with reference to FIG. 5, a given parent node's interleaved address gives information about that parent's children nodes. Said another way, each leaf node (node without children, such as the "011011" in FIG. 5) represents a prefix to some arbitrary path. For instance, if the state engine 206 traverses from the "root" node to the "011" node, the state engine 206 can then determine that all leaf nodes in the "011" node sub-tree are guaranteed to start with the bit sequence "011" (namely, the "011011" and "011110" nodes). Likewise, if the state engine 206 traverses to the "1000" node, the state engine 206 can then determine that each leaf node under the "1000" node starts with "1000".

The state engine 206 can further use the prefixes of a given node to determine information about the individual dimensions of the data structure 300 in FIG. 3. For example, the "1000" node has a prefix of four values, and the last two are undetermined and can be represented as 1000YX; where, as explained above, the Y dimension contributes a value first, followed by the X dimension; thus the fifth digit is the last Y value and the sixth digit is the last X value. The interleaved address of 1000YX can be de-interleaved into dimension addresses: y=10Y and x=00X. In this way, each node in the tree 500 can yield useful information about the un-interleaved dimension addresses. For example, in 1000YX the only possible values for Y and X in the leaf nodes stemming from the parent node "1000" are y={4/100, 5/101} and x={0/000b, 1/001b}, where the backslash does not indicate division but rather a separator between the dimension and the dimension binary address (that is, in "4/100" the 4 refers to the fourth horizontal dimension that has a binary address of "100", in "5/101, the 5 refers to the fifth horizontal dimension that has a binary address of "101", in "0/000" the 0 refers to the first vertical dimension that has a binary address of "000", and in "1/001" the 1 refers to the second vertical dimension that has a binary address of 001"). Note, these are the only possible values for Y and X where given 1000YX because these rows have data stored in them.

Figure 6:
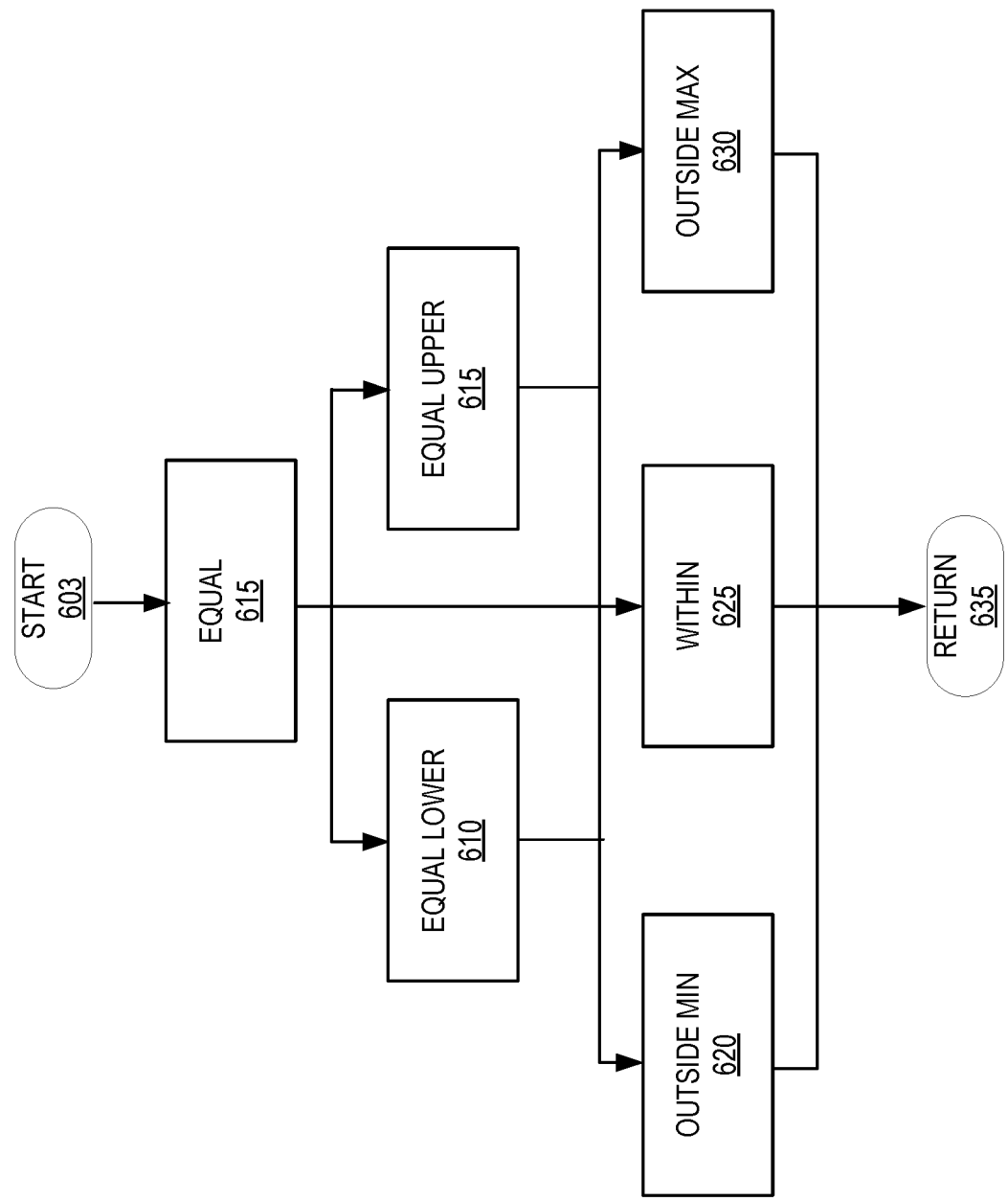
FIG. 6 shows an example recursive state flow diagram for tracking states of dimensions of a data structure, according to some example embodiments.

FIG. 6 shows an example recursive state flow diagram 600 to track states of the dimensions in data structure 300, according to some example embodiments. In searching for rows inside a query box 304, the state engine 206 implements pre-order traversal and keeps track of the state for each dimension. As there are only six states in the example embodiment of FIG. 6, the amount of state data to track is very small and the state engine 206 can track states for each given dimension efficiently using bitwise operations (change a bit from 0 to 1 to indicate which state a given dimension is in).

In some example embodiments, the states include (1) EQUAL 615, (2) EQUAL LOWER 610, (3) EQUAL UPPER 615, (4) WITHIN 625, (5) OUTSIDE MIN 620, AND (6) OUTSIDE MAX 630. Further detailed examples are discussed below, but generally the state engine 206 starts at start block 603 and traverses the z-curve 302 using the z-tree 500 to assign dimensions to one of the states according to the de-interleaved node address. When one or more nodes are eliminated (e.g., due to reaching an outside state) or when a leaf node is encountered, the state engine 302 can return the leaf node value and/or remove the eliminated nodes and return at return block 635.

If a dimension is in EQUAL 615, the dimension is considered equal to both lower and upper bounds in the query box for that particular bit position for that particular column. In some example embodiments, every dimension in the query starts in EQUALS 615 as the state engine 206 is initiated with an empty bit string.

If a dimension is in the EQUAL UPPER 615, the dimension is currently equal to the upper bounding box corner of a query box for that particular bit position but not lower bounding box corner of the query box.

If a dimension is in the EQUAL LOWER 610, the dimension is currently equal to the lower bounding box corner of a query box for that particular bit position but not the upper bounding box corner of the query box.

If a dimension is in the WITHIN 625, the dimension is strictly within a query box, non-inclusive of the bounds of the query box.

If a dimension is in either OUTSIDE MIN 620 or OUTSIDE MAX 630, the dimension is outside the query box.

In some example embodiments, all dimensions start in the EQUAL 615, representing the case where the lower and upper boundaries for the query box are identical. As the state engine 206 searches through rows, if it reaches a row of a dimension that is too low or high for any dimension, the state engine 206 exits that node (on the tree 500), goes to the last parent node that is still within bounds, and starts down the next branch. If the state engine 206 reaches a leaf node and it is in within bounds (e.g., is not in one of the outside states), then the leaf node (and corresponding row) in data structure is a match for the query. The state engine 206 adds the data in the matching row to a result set and keeps traversing for further matching results.

In some example embodiments, the state WITHIN 625 is a type of optimization state that indicates that for a given dimension in the state WITHIN 625, every child node further down the tree will be a match, so there is no need to continue checking states for those nodes. Further, in some example embodiments, the state engine 206 stops searching once it reaches a row that is outside the upper boundary of the query box.

In this way, the state engine 206 enables a performance improvement because once a dimension is in an outside state, the corresponding node sub-tree is skipped. This is due to the z-curve encoding (e.g., coding of curve 302) starting with the most significant bits first, and hence the lower bits (e.g., lower bits belonging to child nodes) cannot re-enter a state inside the query box once a parent node has exited. Additionally, the state engine 206, due to the pre-order traversal from left to right, finds matching rows by ascending a z-curve in an optimal order. Thus, the state engine 206 may be particularly suitable for log structured data stores in which rows are stored in sorted order, such as HBase, thereby minimizing I/O seeks.

For further clarity, a detailed example is now discussed with reference to FIG. 3 and FIG. 5. Assume, as indicated by the query box 304 in FIG. 3, a query is executed over y={1-5}/{001 to 101} and x={3-5}/{011 to 101}. As the root node of tree 500 represents empty bounds, the state engine 206 sets all dimensions to the Equal State.

(1) The state engine 206 traverses the tree 500 in prefix order (left, then right) so the state engine 206 goes to 011 node, which de-interleaves to y-prefix: 01Y and x-prefix: 1XX. In regards to the Y state, 01Y is guaranteed to meet the y-bounds for the query box 304, so the state for Y is set to WITHIN. The state engine 206 does not further evaluate the Y state as long as it is within node 011 of tree 500. In regards to the X state of 1XX, it is possible that the X state can exit the query box 304, so the state is updated to EQUAL UPPER 615 State because the dimension matches the upper bounds for x at that point but not the lower.

(2) The state engine 206 traverses to "011011" node, a leaf node. The node decodes to y=011 and x=101. The row is returned, and state engine 206 restores the state to what it was while at the "011" node.

(3) The state engine 206 traverses to "011110" node, which is also a leaf node. The node decodes to y=011 and x=110. This violates the x-bounds, so the row is not returned. There are no more nodes from "011" node, so the state engine 206 restores root node to the EQUAL STATE 615.

(4) The state engine 206 traverses from the root node to the "100" node, which de-interleaves to y-prefix: 10Y, and x-prefix: 0XX. Accordingly, the state engine 206 sets the Y state to WITHIN 625 State, because it is impossible to violate the Y-bounds at this point. The state engine 206 does not evaluate Y state as long as it in the "100" sub-tree. Turning to the other dimensions, the state engine 206 sets the X-state to EQUAL LOWER 610 State as it is possible to violate the x-bounds if the state engine 206 goes below the minimum bounds.

(5) The state engine 206 traverses to node "1000", which has x-prefix: 00, where the X-state is set to OUTSIDE MIN 620 State. This is because it is impossible for an x-value that starts with "00" to meet the query constraints, so the state engine 206 ignores or otherwise eliminates the entire sub-tree stemming from node "1000". The state engine 206 resets to node "100" where Y-state=WITHIN and X-state=EQUAL LOWER.

(6) The state engine 206 traverses to the "10011" node, where x-prefix: 01X. The X can still leave the query box 304, so the state is unchanged at x=EQUAL LOWER.

(7) The state engine 206 traverses to "100110" node, where x-prefix: 010, which is outside the query bounds, so the state engine 206 rejects the row and goes back to the "10011" node.

(8) The state engine 206 traverses to the "100111" node where X-prefix: 011. This matches the lower bound of query box 304 exactly, so we return that row.

(9) There are no further nodes in tree 500, so the state engine 206 returns the result set.

Figure 7:
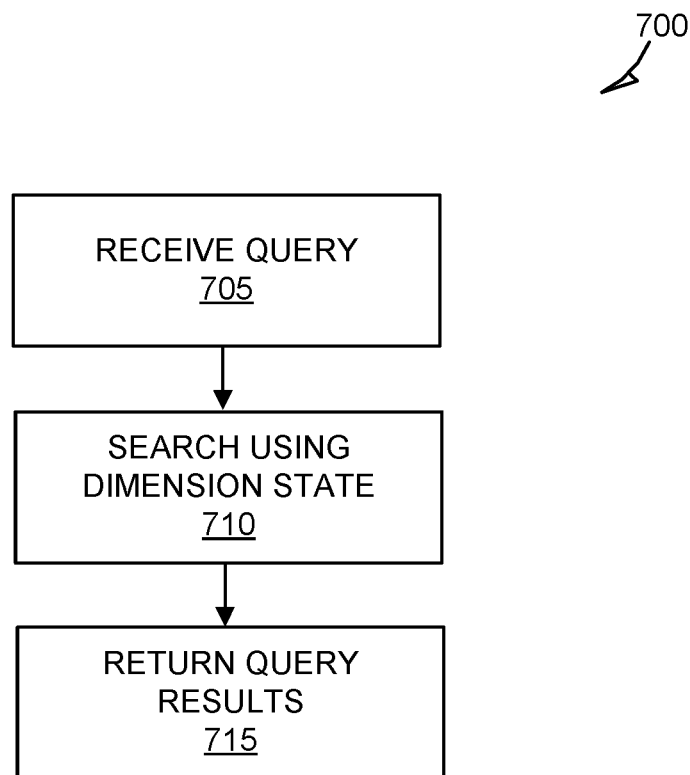
FIG. 7 shows an example flow diagram of a method for implementing state-based searching of a z-tree, according to some example embodiments.

FIG. 7 shows an example flow diagram of a method 700 for implementing state-based searching of a z-tree, according to some example embodiments. At operation 705, the state engine 206 receives a query over one or more dimensions. For example, the state engine 206 may receive the query explicitly referencing the data structure 300: y={1-5}/{001 to 101} and x={3-5}/{011 to 101}. Further in some example embodiments, the state engine 206 receives the query in a query language, such as SQL, and the state engine 206 maps the query language limitations (e.g., WHERE clauses) to limit ranges on dimensions in the data structure 300. After the ranges of the dimensions are limited, a query box, such as query box 304, is generated.

At operation 710, the state engine 206 traverses a tree that caches values that exist in the data structure 300. As discussed above, in some embodiments, as the state engine 206 traverses in pre-fix order on the tree 500, the states of the dimensions are tracked. Further, in some example embodiments, when a node is marked as being in the outside state, that node's sub-tree is removed from the search set. When the search is complete, at operation 715 the state engine 206 returns the query results.

In some example embodiments, a z-tree that maps to values of a multidimensional data structures can also be used to speed up k-nearest neighbor (kNN) analysis. As is appreciated by those of ordinary skill in the art, kNN schemes can be used to classify a data item, describe the data item using regression, and other types of analysis. For example, a scatter plot displays a multitude of points and a kNN scheme may attempt to determine: for a given point, what are the nearest set of k points? While the underlying goal of kNN schemes is easy to understand, implementing a kNN scheme to find the nearest set of k points in a highly dimensional database is a very complex and often inefficient or impossible problem to solve. To this end, a distance engine 208 can use a z-curve data structure and z-tree to efficiently find kNN results. Generally, the set of points to be searched are points in a z-curve data structure that are mapped using a z-tree, as discussed above. In the kNN approach, a query is a leaf node of the z-tree and the distance engine 208 attempts to determine: for the given leaf node, what are the nearest neighbor leaf nodes in a z-curve database. However, it is difficult to calculate distances because a full set of dimensions is not possible until a leaf node is calculated, and simply calculating every leaf node in a large database may not be efficient or possible.

To address this issue, the distance engine 208 is configured to traverse a z-tree to a parent node of a queried node, and determine, from the parent's prefix information, the closest that other children node having the same prefix information could come to the queried node. As all the digits of the potential children nodes may be unknown, the unknown digits may be replaced with all O's to minimize value or all 1's to maximize value on a per dimension basis. If a given parent node is outside the pre-set kNN parameter, then the distance engine 208 skips any node under the parent node.

Figure 8:
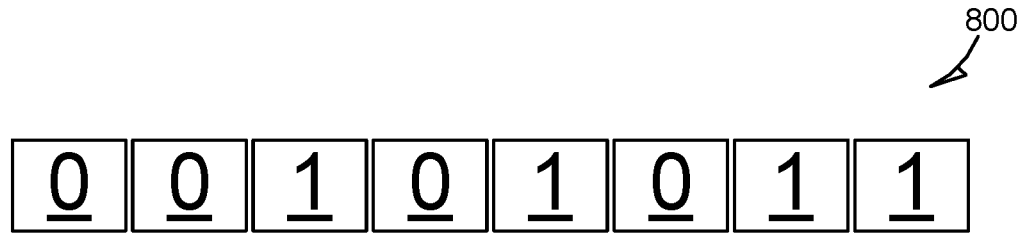
FIG. 8 shows an example of addresses for a nearest neighbor query, according to some example embodiments.
Figure 8:
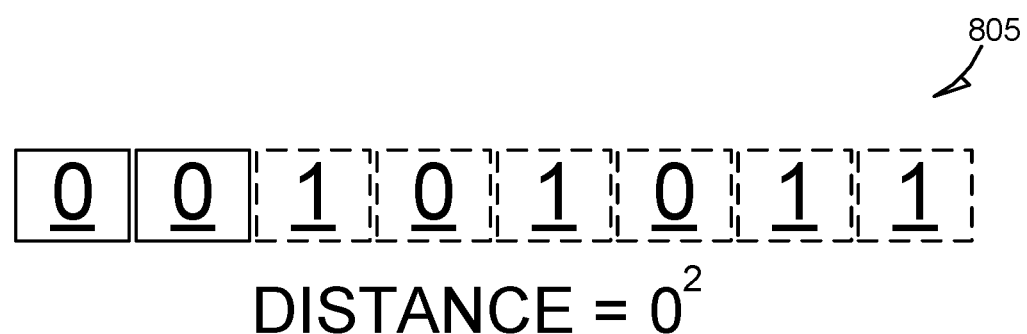
Figure 8:
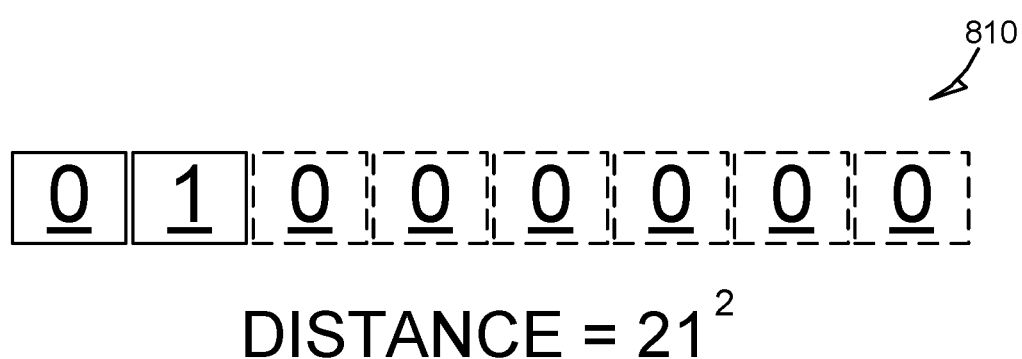

FIG. 8 shows example addresses for a nearest neighbor query, according to some example embodiments. In the example shown, assume the z-curve data structure (e.g., data structure 300 in FIG. 3) has an 8-bit dimension and the distance engine 208 receives a query of 43, which is 00101011 in binary as shown by address 800 in FIG. 8. Further assume the distance engine 208 is on a parent node in which each child node represents only the first two bits of data for that dimension (e.g., the first two bits of the full 8-bits for that dimension). Address 805 shows the first child node which has two leading zeros and six uncalculated digits (represented by dashed boxes), and address 810 shows a second child node which has a 0 followed by a 1 for the known digits and again six uncalculated digits represented by dashed boxes.

In some example embodiments, as discussed, the distance engine 208 determines how close each of addresses 805 and 810 could possibly come to address 800. In the case of address 810, the first two digits match the first two digits of address 800, so the distance engine 208 assumes that the rest of the digits are the same; thus, all the digits in address 805 match address 800, and the distance between them is $0^2$. The square term arises from the distance engine 208 being configured to compute the distance as the sum of squares using the standard Euclidean distance formula $(r1d1-r2d1)^2+(r1d2-r2d2)^2+\ldots+(r1dn-r2dn)^2$ for n dimensions given a particular dimension d for two z-curves r1 and r2.

As for address 810, the second digit of address 810 is "more significant" than the second digit of address 800, making the address 810 larger than address 800. To determine what is the closest distance that any child node having the first two digits of "01" could come to the queried address 800, all of the remaining digits in 800 are assumed to be 0, thereby minimizing the value of address 800, which gives a value of 01000000, which is 63 in decimal. As explained above, the distance between the address 800 and any possible child node of address 810 is then: 63−43=21, or $21^2$ if computing squares as explained above. Thus, if the 21 exceeds the threshold kNN distance, the distance engine 208 skips the sub-tree of nodes starting with "01" (e.g., variations of address 810).

The distance engine 208 can also reset bits to determine distances between z-curves, according to some example embodiments. For example, suppose the distance engine 208 is to determine values in a 8-bit dimension between two z-curves, e.g., 1010XXXX and 1100XXXX, where XXXX represents the lower bits of unknown values that the child nodes represent. Since 1100XXXX is necessarily more significant than 1010XXXX, the distance engine 208 minimizes possible distances between the two curves by setting the unknown bits in 1100XXXX to 0 and the unknown bits in 1010XXXX to 1. The distance calculation then becomes 11000000-10101111, yielding a minimal distance of 00010001, or 17 in decimal. It is therefore impossible for any leaf node under the particular parent to have a distance of less than 17. If the maximum distance in the result set is 16 or less, the distance engine 208 avoids traversing down that particular node. As such, by eliminating parent nodes that cannot possibly contain closer candidate nodes, the distance engine 208 can efficiently search and return nearby nodes in a given tree.

In some example embodiments, the distance engine 208 is configured using breadth-first traversal with a min-heap priority queue. In this way, the distance engine 208 returns k results instead of just one result. In these example embodiments, when the distance engine 208 reaches a child node, if the heap size is smaller than k, then the child node is added to the result set.

The distance engine 208 can be configured to implement the heap approach as follows:

```
:::::::HEAP CONFIGURATION BEGIN:::::::
if (child.isLeafNode( )) {
    if (maxHeap.size( ) < k) {
        maxHeap.add(candidate);
    }
    else if (maxHeap.peek( ).distance.compareTo(candidate.distance) >
0) {
        maxHeap.removeHead( );
        maxHeap.add(candidate);
    }
}
:::::::HEAP CONFIGURATION END:::::::
```

Figure 9:
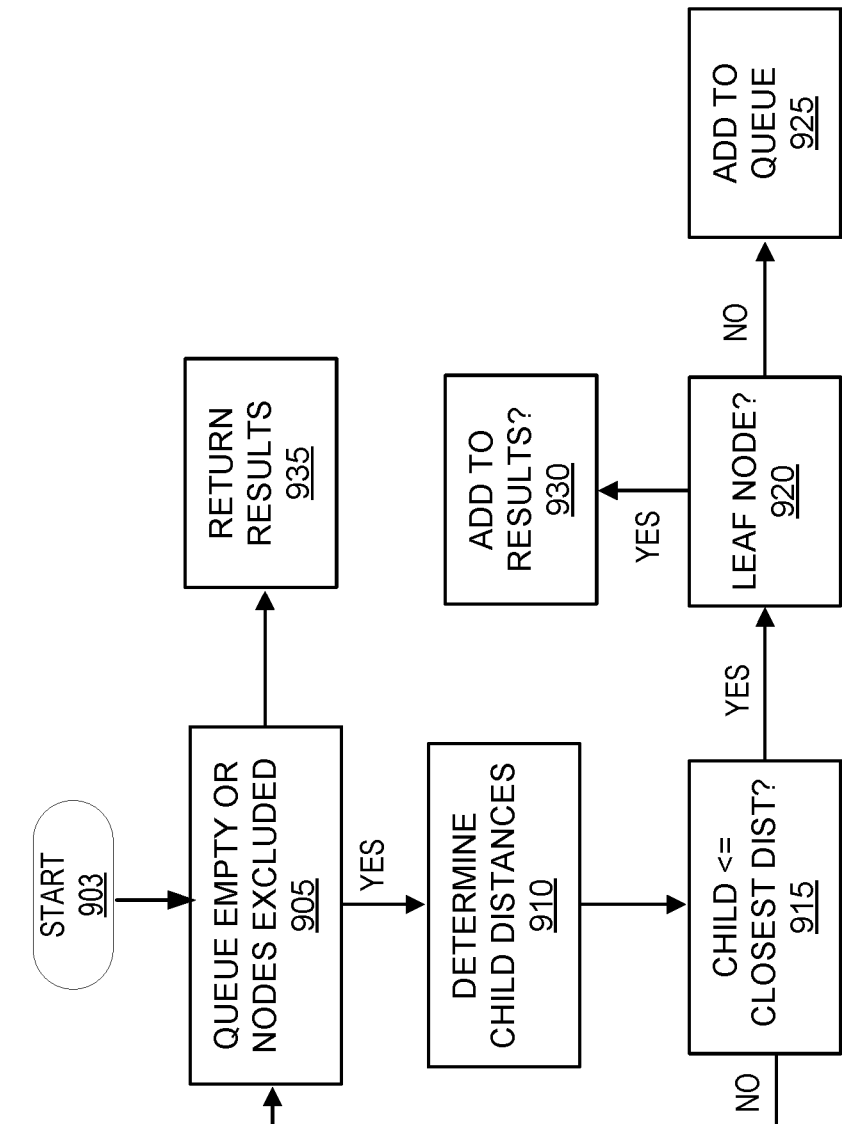
FIG. 9 shows an example flow diagram of a method for implementing a kNN approach, according to some example embodiments.

FIG. 9 shows an example flow diagram of a method 900 for implementing a heap-based kNN approach, according to some example embodiments. After start bar 903, at operation 905, the distance engine 208 determines whether there are nodes to be analyzed in a queue or if the queue is empty. If the queue is empty, then distance engine 208 returns results at operation 935. If, at operation 905, distance engine 208 determines that there are one or more nodes in the queue to be analyzed, the distance engine 208 continues to operation 910.

At operation 910, the distance engine 208 determines the child node distances from the query using the minimizing approach discussed above (e.g., replacing digits with 1's or 0's on a per dimension basis and determining closest possible distance). At operation 915, the distance engine 208 determines whether child node smaller than or equal to the closest distance. If the distance is too large, the distance engine 208 returns to operation 905, where the nodes are excluded; if there are remaining nodes in the queue, the process repeats. On the other hand, if at operation 915 the distance is satisfied, the distance engine 208 goes to operation 920.

At operation 920, if the node is a leaf node, then the distance engine 208 adds it to the results at operation 930. Whereas if the node is not a leaf node and there are remaining child nodes, the child nodes are added to the queue at operation 925. The distance engine 208 can then return to operation 905 for further processing.

Figure 10:
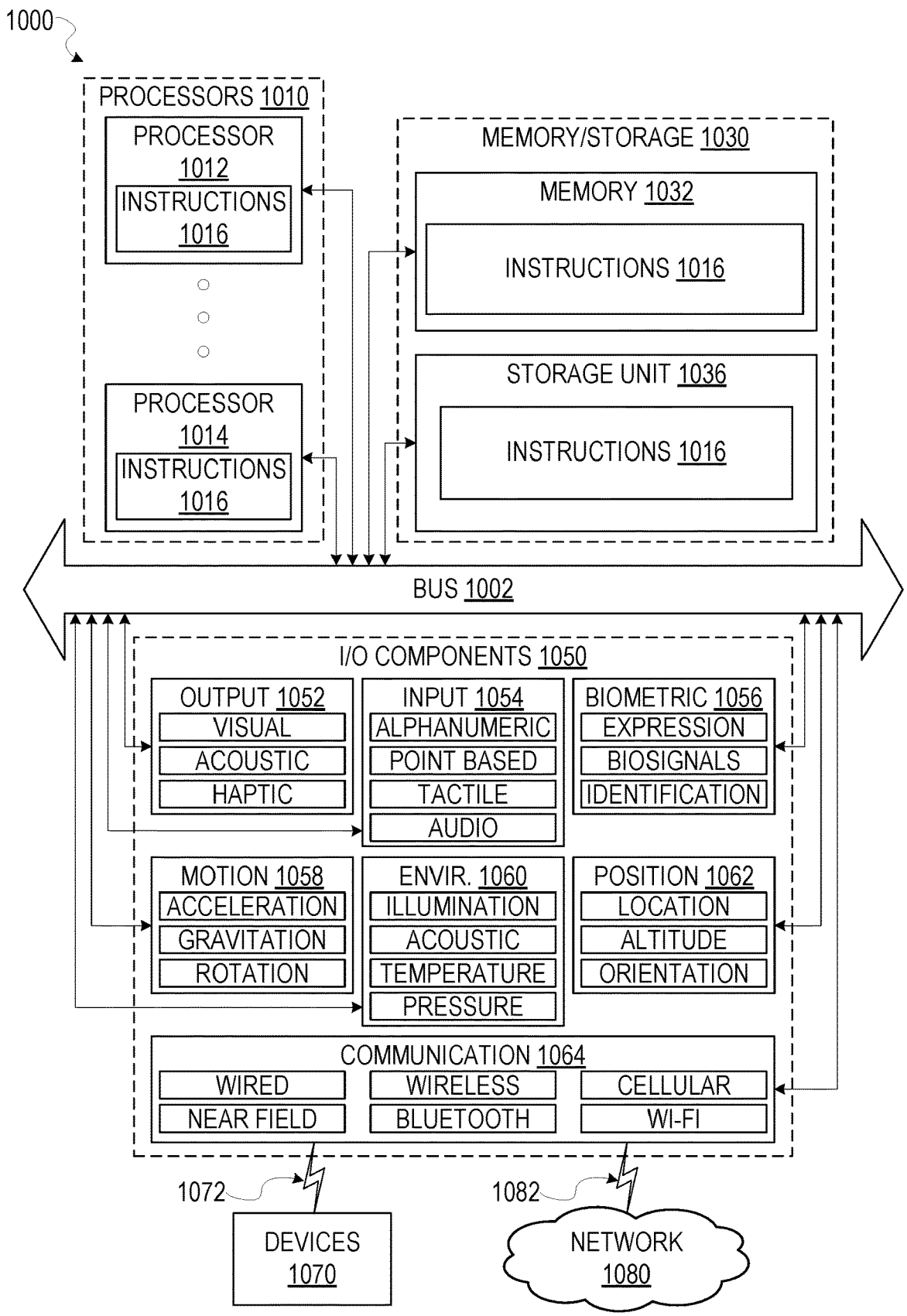
FIG. 10 is a diagrammatic representation of a machine in the example form of a computer system within which a set of instructions for causing the machine to perform any one or more of the methodologies discussed herein may be executed.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may include executable code that causes the machine 1000 to execute the methods discussed above as well as the associated functionalities described herein. These instructions 1016 transform the general, non-programmed machine into a particular machine programmed to carry out the described and illustrated functions of the engines disclosed herein. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. By way of non-limiting example, the machine 1000 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include a multi-core processor that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multidimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network (e.g., the communication network 104 of FIG. 1).

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled. Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description. All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein."

Also, in the following claims, the terms "including" and "comprising" are open-ended, that is, a system, device, article, or process that includes elements in addition to those listed after such a term in a claim are still deemed to fall within the scope of that claim.

What is claimed is:

1. A method comprising:
   identifying, using one or more processors of a machine, a query against a data structure having multiple dimensions, entries in the data structure having addresses mapped along a continuous curve spanning the data structure, the entries in the data structure storing values being tracked in a tree structure, the addresses of the entries being composed from dimension address portions of the multiple dimensions, the query defining one or more ranges on the multiple dimensions;

searching in the tree structure for end nodes by tracking states of each of the multiple dimensions, the states at least indicating whether each of the multiple dimensions is outside or inside boundaries of the query; and returning, as query results, end nodes that satisfy the boundaries of the query according to the states.

2. The method of claim 1, wherein the tree structure comprises a plurality of nodes, including end nodes that have addresses of entries that store values in the data structure.

3. The method of claim 2, wherein the tree structure is a radix tree.

4. The method of claim 2, wherein the states include a within state that indicates that one or more of the plurality of nodes is within the one or more ranges.

5. The method of claim 4, wherein the tree structure is searched by not analyzing a state of a dimension that has already been assigned as being in the within state.

6. The method of claim 2, wherein the states include an outside query state that indicates that a node of the plurality of nodes is outside the one or more ranges set by the query.

7. The method of claim 6, wherein searching the tree structure comprises not searching one or more nodes due to the node being assigned to the outside query state.

8. The method of claim 6, wherein searching the tree structure comprises not searching a sub-tree of nodes due to the node being assigned to the outside query state, the sub-tree of nodes including the node.

9. The method of claim 1, wherein the entries are composed from the dimension address portions by interleaving the dimension address portions.

10. The method of claim 9, further comprising:
de-interleaving the dimension address portions in nodes of the tree structure to determine the states of the dimensions.

11. The method of claim 9, wherein the addresses are interleaved from left to right.

12. The method of claim 1, wherein the tree structure is searched from left to right.

13. A system comprising:
one or more processors of a machine; and
a memory storing instructions that, when executed by the one or more processors, cause the machine to perform operations comprising:
identifying a query against a data structure having multiple dimensions, entries in the data structure having addresses mapped along a continuous curve spanning the data structure, the entries in the data structure storing values being tracked in a tree structure, the addresses of entries being composed from dimension address portions of the multiple dimensions, the query defining one or more ranges on the multiple dimensions;
searching in the tree structure for end nodes by tracking states of each of the multiple dimensions, the states at least indicating whether each of the multiple dimensions is outside or inside boundaries of the query; and
returning, as query results, end nodes that satisfy the boundaries of the query according to the states.

14. The system of claim 13, wherein the tree structure comprises a plurality of nodes, including end nodes that have addresses of entries that store values in the data structure.

15. The system of claim 14, wherein the tree structure is a radix tree.

16. The system of claim 14, wherein the states include a within state that indicates that one or more of the plurality of nodes is within the one or more ranges.

17. The system of claim 16, wherein the tree structure is searched by not analyzing a state of a dimension that has already been assigned as being in the within state.

18. The system of claim 16, wherein the states include an outside query state that indicates a node of the plurality of nodes is outside the one or more ranges set by the query.

19. A machine-readable storage medium embodying instructions that, when executed by a machine, cause the machine to perform operations comprising:
identifying, using one or more processors of the machine, a query against a data structure having multiple dimensions, entries in the data structure having addresses mapped along a continuous curve spanning the data structure, the entries in the data structure storing values being tracked in a tree structure, the addresses of entries being composed from dimension address portions of the multiple dimensions, the query defining one or more ranges on the multiple dimensions;
searching in the tree structure for end nodes by tracking states of each of the multiple dimensions, the states at least indicating whether each of the multiple dimensions is outside or inside boundaries of the query; and
returning, as query results, end nodes that satisfy the boundaries of the query according to the states.

20. The machine-readable storage medium of claim 19, wherein the tree structure comprises a plurality of nodes, including end nodes that have addresses of entries that store values in the data structure.

* * * * *